(12) United States Patent
Nakai et al.

(10) Patent No.: US 8,105,654 B2
(45) Date of Patent: Jan. 31, 2012

(54) THERMOADHESIVE CONJUGATE FIBERS AND NONWOVEN FABRIC EMPLOYING THEM

(75) Inventors: Yoshihiro Nakai, Osaka (JP); Masuo Iwata, Moriyama (JP)

(73) Assignees: Chisso Corporation, Osaka-shi, Osaka (JP); Chisso Polypro Fiber Compound Ltd., Chiyoda-ku, Tokyo (JP)

(*) Notice: Subject to any disclaimer, the term of this patent is extended or adjusted under 35 U.S.C. 154(b) by 0 days.

(21) Appl. No.: 12/263,973

(22) Filed: Nov. 3, 2008

(65) Prior Publication Data

US 2009/0061709 A1 Mar. 5, 2009

Related U.S. Application Data

(63) Continuation of application No. 10/155,534, filed on May 24, 2002, now abandoned.

(30) Foreign Application Priority Data

May 28, 2001 (JP) .................................. 2001-158484

(51) Int. Cl.
*B05D 3/02* (2006.01)
(52) U.S. Cl. .................. 427/384; 427/385.5; 427/389.9; 427/394
(58) Field of Classification Search .................. None
See application file for complete search history.

(56) References Cited

U.S. PATENT DOCUMENTS

| 4,146,590 | A | | 3/1979 | Yamamoto et al. |
| 4,263,009 | A | | 4/1981 | Brendle et al. |
| 4,500,384 | A | * | 2/1985 | Tomioka et al. ............ 156/290 |
| 4,950,541 | A | | 8/1990 | Tabor et al. |
| 5,167,764 | A | * | 12/1992 | Nielsen et al. ............ 162/146 |
| 5,654,086 | A | | 8/1997 | Nishijima et al. |
| 5,981,410 | A | | 11/1999 | Hansen et al. |
| 6,127,433 | A | * | 10/2000 | Sugo et al. ................ 521/29 |
| 6,436,855 | B1 | * | 8/2002 | Iwata et al. ............... 442/99 |

FOREIGN PATENT DOCUMENTS

| JP | 53-126320 | 11/1978 |
| JP | 54-30929 | 3/1979 |
| JP | 8-325937 | 12/1996 |
| JP | 9-49166 | 2/1997 |
| JP | 10-273884 | 10/1998 |
| JP | 2000-212866 | 8/2000 |
| WO | WO 98/45519 | 10/1998 |

OTHER PUBLICATIONS

Abstracts and partial machine translation of JP 2000-212866, Aug. 2000.*

* cited by examiner

*Primary Examiner* — Erma Cameron
(74) *Attorney, Agent, or Firm* — Merchant & Gould P.C.

(57) ABSTRACT

To provide thermoadhesive conjugate fibers, nonwoven fabrics and cellulosic fiber blended nonwoven fabrics employing them, and wipers and absorbers employing the fabrics, thermoadhesive conjugate fibers comprise a thermoplastic resin (I) containing a modified polyolefin with at least one type of reactive functional group as a first component and having a second component composed of a thermoplastic resin (II) with a higher melting point than the thermoplastic resin (I) of the first component combined in a conjugate therewith, the first component being formed continuously along the length of at least a portion of the fiber surface, wherein the fiber surfaces are coated with a fiber treating agent containing a multifunctional compound capable of reacting with the reactive functional group of the modified polyolefin.

16 Claims, No Drawings

THERMOADHESIVE CONJUGATE FIBERS AND NONWOVEN FABRIC EMPLOYING THEM

This application is a Continuation of U.S. Ser. No. 10/155,534, filed 24 May 2002, which claims benefit of Serial No. 2001-158484, filed 28 May 2001 in Japan and which applications are incorporated herein by reference. To the extent appropriate, a claim of priority is made to each of the above disclosed applications.

FIELD OF INVENTION

The present invention relates to thermoadhesive conjugate fibers with satisfactory thermoadhesive properties, to nonwoven fabrics and cellulosic fiber blended nonwoven fabrics employing them and to wipers and absorbers employing the fabrics.

BACKGROUND OF THE INVENTION

Thermoadhesive conjugate fibers having conjugate form comprising on the fiber surface a low-melting-point component made of polyethylene, a ethylene-propylene-butene copolymer or crystalline polypropylene, and at the fiber center a high-melting-point component made of an ethylene-propylene-butene copolymer, crystalline polypropylene or a polyester, are widely known.

Such thermoadhesive conjugate fibers are usually formed into a web and then heated at a temperature above the melting point of the low-melting-point component and below the melting point of the high-melting point component to allow formation of a nonwoven fabric wherein the contacting sections between the fibers composing the web are fused together.

However, because such thermoadhesive conjugate fibers have low adhesion for other materials (for example, cloth, wood or metal), it is necessary to use a binder (for example, polyvinyl alcohol or the like) to improve the adhesion when the nonwoven fabric is to be employed for obtaining a conjugate material bonded to another material or for blending with other materials to obtain cellulosic fiber blended nonwoven fabrics. When such a binder is used, however, the (cellulosic fiber blended) nonwoven fabric surface becomes coated with the binder to form a film, and this has caused problems such as reduced performance (absorption properties, etc.) of the (cellulosic fiber blended) nonwoven fabric, or in the case of a thick (cellulosic fiber blended) nonwoven fabric, seepage of the binder into the interior resulting in interlayer peeling of the (cellulosic fiber blended) nonwoven fabric.

In recent years, several processes have been developed for the purpose of improving the adhesion in order to overcome these problems (Japanese Patent Application Laid-Open No. 53-126320, Japanese Patent Application Laid-Open No. 54-30929, Japanese Patent Application Laid-Open No. 2000-212866, U.S. Pat. Nos. 4,950,541, 5,981,410). However, it is currently the situation that all of these processes still produce inadequate fiber strength or nonwoven fabric strength, despite providing satisfactory adhesion with other materials.

SUMMARY OF THE INVENTION

It is an object of the present invention to provide novel thermoadhesive conjugate fibers which have excellent adhesion with other materials while also allowing the obtained nonwoven fabrics to exhibit sufficient strength. It is another object to provide thermoadhesive conjugate fibers which, when blended with other materials (for example, cellulosic fibers) to obtain cellulosic fiber blended nonwoven fabrics, exhibit firm adhesion with the other materials to prevent peeling or losing from the other materials, and provide sufficient strength to prevent tearing. It is yet another object to provide nonwoven fabrics and cellulosic fiber blended nonwoven fabrics having the aforementioned characteristics and wipers and absorbers that employ the fabrics.

As a result of much diligent research, the present inventors have completed the present invention upon finding that excellent adhesion with other materials (particularly cellulosic fibers) and high nonwoven fabric strength are exhibited by thermoadhesive conjugate fibers wherein the surfaces of thermoadhesive conjugate fibers employing a modified polyolefin which includes a reactive functional group are coated with a fiber treating agent containing a multifunctional compound capable of reacting with the reactive functional group.

DETAILED DESCRIPTION OF THE INVENTION

The thermoadhesive conjugate fibers of the invention comprise a thermoplastic resin (I) containing a modified polyolefin with at least one type of reactive functional group as a first component and a thermoplastic resin (II) with a higher melting point than the first component as a second component, and it is characterized in that the first component is formed continuously along the length of at least a portion of the fiber surface, and the fiber surfaces are coated with a fiber treating agent containing a multifunctional compound capable of reacting with the reactive functional group in the modified polyolefin.

The reactive functional group of the modified polyolefin contained in the thermoplastic resin (I) as the first component may be appropriately selected in consideration of the reactivity with the multifunctional compound in the fiber treating agent, and it is not particularly restricted. Specifically there may be mentioned as examples hydroxyl, amino, nitrile, nitro, amide, carbonyl, carboxyl and glycidyl groups.

The modified polyolefin with the reactive functional group may be obtained by copolymerizing a vinyl monomer having the reactive functional group with an olefin monomer. The modified polyolefin may be a block, random or ladder copolymer. The vinyl monomer may alternatively be graft copolymerized in the polyolefin.

As vinyl monomers with reactive functional groups there may be mentioned unsaturated carboxylic acids such as maleic acid, acrylic acid, methacrylic acid, fumaric acid and itaconic acid, or derivatives thereof or their anhydrides, styrenes such as styrene and á-methylstyrene, methacrylic acid esters such as methyl methacrylate, ethyl methacrylate, 2-hydroxyethyl methacrylate and dimethylaminoethyl methacrylate, or the corresponding acrylate acid esters, as well as glycidyl acrylate, glycidyl methacrylate, butenecarboxylic acid esters, allyl glycidyl ether, 3,4-epoxybutene, 5,6-epoxy-1-hexene and vinylcyclohexene monoxide.

The modified polyolefin to be used for the invention is preferably a modified polyolefin obtained by graft copolymerization of a vinyl monomer composed of an unsaturated carboxylic acid or its derivative or anhydride, with a polyolefin, from the standpoint of common usage and easy obtainment, and achieving affinity with numerous types of other materials and particularly satisfactory adhesion with hydroxyl group-containing materials such as cellulosic fibers.

Such modified polyolefins are preferred because they are easily worked into fibers and exhibit high polymer strength, yielding high strength as fibers.

The modification ratio is preferably at least 0.1 mole/kg in order to improve the reactivity with the multifunctional compound in the fiber treating agent and create a more extensive crosslinked structure.

Ethylene, propylene, butene-1 or the like is preferably used as the main monomer for the modified polyolefin.

When the modified polyolefin is a graft copolymer with the vinyl monomer, the main polymer of the modified polyolefin (the polyolefin before modification) is preferably polyethylene, polypropylene, polybutene-1 or the like, and high-density, linear low-density or low-density polyethylene is particularly preferred.

When polyethylene is used as the main polymer, an ethylene polymer or a copolymer of ethylene with another á-olefin, having a density of 0.90-0.97 g/cm$^3$ and a melting point of about 100-135° C., is preferred.

When polypropylene is used as the main polymer, crystalline propylene polymer or a copolymer of propylene with another olefin, having a melting point of 130-170° C., is preferred.

When polybutene-1 is used as the main polymer, crystalline butene-1 polymer or a copolymer of butene-1 with another olefin, having a melting point of 110-130° C., is preferred.

Among these polymers, polyethylene is preferred from the standpoint of ease of utilization as a low-melting-point component and ease of modifying vinyl monomers, and high-density polyethylene is more preferred because of its high polymer strength which allows improvement in nonwoven fabric strength.

The thermoplastic resin (I) of the first component is not particularly restricted so long as it contains the aforementioned modified polyolefin, and it may be a simple modified polyolefin, a blend of two or more modified polyolefins, or a blend of at least one type of modified polyolefin with at least one type of other thermoplastic resin.

When the modified polyolefin is a graft copolymer, the polymer will tend to have lower polymer strength than the main polymer due to the graft copolymerization. Thus, in order to maintain high fiber strength the thermoplastic resin (I) is preferably a blend of a modified polyolefin having a high modification ratio with a polyolefin that has not been modified.

The thermoplastic resin (II) used according to the invention is a thermoplastic resin with a higher melting point than the thermoplastic resin (I). As such thermoplastic resins there may be preferably used, for example, polypropylene, polyethylene, copolymers of ethylene, propylene, α-olefins and the like, and crystalline polymers of polyester, polyamide and the like.

If the thermoplastic resin (II) has a high melting point against thermoplastic resin (I), a blend of a plurality of thermoplastic resins may be used as the thermoplastic resin (II) instead of a single type. The thermoplastic resin (II) is preferably a polyolefin from the standpoint of chemical resistance and compatibility with the modified polyolefin, and it is preferably high-melting-point polypropylene which gives a higher difference in melting point with the thermoplastic resin (I), from the standpoint of workability when obtaining nonwoven fabrics or cellulosic fiber blended nonwoven fabrics by thermoadhesive between fibers. Polyesters are also preferred for use because of their high melting points.

There may also be appropriately added to the thermoplastic resin (I) of the first component and the thermoplastic resin (II) of the second component, additives which exhibit various types of performance depending on the need, such as antioxidants, photostabilizers, ultraviolet absorbers, neutralizers, nucleating agents, epoxy stabilizers, lubricants, anti-fungus agents, flame retardants, antistatic agents, pigments, plasticizers and the like, within ranges that do not impede the effect of the invention.

The thermoadhesive conjugate fibers of the invention must have the first component formed on at least a portion of the fiber surface. Such conjugate fibers may be obtained using a spinning pack for side-by-side type, core/sheath type or eccentric core/sheath type fibers having the first component as the sheath and the second component as the core.

The cross-sectional shape of the thermoadhesive conjugate fibers of the invention may have any of various forms, for example, round such as circular or oval, polygonal such as square or triangular, or irregular such as key-shaped or eight branch leaf.

The thermoadhesive conjugate fibers of the invention will have adhesive force for other materials even if the first component is formed on a small portion of the fiber surface, but for satisfactory adhesive force it is preferred for the ratio of circumferences in the fiber cross-section to be 50%. Thermoadhesive conjugate fibers having a core/sheath structure with a ratio of circumferences in the fiber cross-section of 100% or nearly 100% are particularly preferred to exhibit especially strong adhesive force.

The thermoadhesive conjugate fibers of the invention will be spinnable so long as the component ratio of the first component and second component of the fiber cross-section is in the range of 10/90 to 90/10. When the first component is reduced the adhesion is lower and when it is increased the adhesion points become firmer, and therefore the component ratio may be determined in consideration of the desired adhesive force; however, a component ratio of 30/70 to 70/30 is preferred for preventing reduced conjugate fiber strength and fiber workability.

The thermoadhesive conjugate fibers of the invention may be spun with an ordinary melt spinning machine. The spinning temperature will differ depending on the thermoplastic resin used, but will normally be carried out in the range of 180-350° C. However, the first component is preferably spun at a low temperature in order to minimize decomposition and deterioration of the modified polyolefin in the first component.

The size of the as-spun fiber may be appropriately selected depending on the need.

The as-span fiber obtained by the spinning is drawn at a lower temperature than the melting point of the first component (usually 40-120° C.) to any desired draw ratio (usually 2-6), and then crimped if necessary. There is no particular requirement either for crimping or no crimping, as it is sufficient to achieve a shape suitable for nonwoven fabric working. For example, when using thermoadhesive conjugate fibers by an air-laid method, there is no particular need for crimping of the fibers, although normally the fibers used will have crimping of 0-20 crimps/2.54 cm. On the other hand, when using thermoadhesive conjugate fibers by a carding method, crimping of the fibers is essential, and the fibers used will normally have crimping of 5-30 crimps/2.54 cm. The crimping of the fibers may be mechanical crimping with a machine, or crimping arising by actual or latent crimping of the conjugate fibers themselves.

The thermoadhesive conjugate fibers which have been drawn and then crimped are usually cut to a desired length.

The cutting method and the length of the fibers are not particularly restricted so long as they result in a length suited for nonwoven fabric working.

The thermoadhesive conjugate fibers of the invention are usually used with fiber fineness of 0.5-100 dtex, but there is no particular restriction in this regard. For increased nonwoven fabric strength, a thinner fiber fineness will generally result in more fibers and adhesive point per given area, and a fiber fineness of 0.5-10 dtex is therefore preferred.

The fiber treating agent used for the invention is not particularly restricted so long as it contains a multifunctional compound (a compound having two or more functional groups such as hydroxyl, amino, nitrile, nitro, amide, carbonyl, carboxyl or glycidyl groups per molecule) that can react with the reactive functional group of the modified polyolefin in the first component, and compounds composed of mixtures of polyhydric alcohols, polyamines, polycarboxylic acids and hydroxyl groups are preferred in consideration of safety, handleability and reactivity with the modified polyolefin.

Polyhydric alcohols are alcohols having two or more hydroxyl groups per molecule. Polyamines are aliphatic compounds having two or more amino groups ($—NH_2$) or imino groups ($=NH$), but according to the invention, compounds having two or more $—NR_2$, $—RNH$ or $—NH_2$ groups per molecule may also be used.

The multifunctional compound will usually be diluted with water for use, and is therefore preferably a water-soluble compound, of which there may be mentioned glycerin, ethylene glycol, ethylenediamine, diethylenetriamine, maleic acid and triethanolamine.

The fiber treating agent used for the invention may consist only of the aforementioned multifunctional compound, but may also contain esters, for example, aliphatic esters such as 2-ethylhexyl stearate or isopropyl myristate, as lubricating agents, natural oils and fats such as coconut oil or beef tallow, anionic surfactants as antistatic agents, for example, alkyl sulfates, fatty acid soaps, alkyl sulfonates, alkylphosphoric acid esters and the like, as well as antioxidants, preservatives, rust preventives, antifungal agents, wettability enhancers and the like, within a range that does not inhibit the effect of the invention.

There are no particular restrictions on the process for coating the thermoadhesive conjugate fibers with the fiber treating agent, and any common publicly known method may be utilized. For example, a coating method using a touch roll, spraying, immersion or the like may be employed during the spinning step, drawing step, cutting step or later steps.

The coating coverage is usually preferred to be in the range of 0.1-2.0 wt % of the fiber treating agent solid matter with respect to the weight of the fibers. The coating coverage of the multifunctional compound in the fiber treating agent is sufficient at 0.005% or more with respect to the fiber weight, and there is no problem with a greater degree of coating coverage.

Since the thermoadhesive conjugate fibers of the invention have a modified polyolefin with the aforementioned reactive functional group in the first component, where the fiber surfaces are coated with a fiber treating agent containing a multifunctional compound that is reactive with the reactive functional group, heat treatment of the fibers causes reaction between the reaction functional group in the modified polyolefin and the multifunctional compound in the fiber treating agent, forming a reticulate structure (a crosslinked structure) with the modified polyolefin. This can be confirmed by the reduced melt flow rate (higher melt viscosity) of the thermoadhesive conjugate fibers after coating of the fiber treating agent and heat treatment, as compared to thermoadhesive conjugate fibers which are not coated with a fiber treating agent. Thus, the thermoadhesive conjugate fibers of the invention are advantageous for production of high-strength nonwoven fabrics, since crosslinking reaction occurs at the adhesive point between the thermoadhesive conjugate fibers resulting in firm adhesion points, and fiber deformation (variation in the fiber cross-sectional area due to melting and flow off of the fiber surface by heating) caused by high temperature treatment can be minimized, thus preventing very small fiber cross-sections and avoiding reduced strength of the fibers themselves. In addition, the thermoadhesive conjugate fibers of the invention also have highly satisfactory adhesion with other materials, and thus for example, when blended with cellulosic fibers and the like, are able to greatly minimize peeling and losing.

A nonwoven fabric of the invention is obtained using the thermoadhesive conjugate fibers of the invention, but other thermoadhesive conjugate fibers may also be included depending on the need, so long as the effect of the invention is not impeded.

A nonwoven fabric according to the invention may be obtained by forming a web of the thermoadhesive conjugate fibers of the invention and subjecting the web to heat treatment. The working method used in this case may be a commonly used one such as carding or air-laying, but when employing a working method such as sheeting or spun lacing, whereby the fiber treating agent coated onto the thermoadhesive conjugate fiber surface flows off, it is necessary to include means such as preheating treatment to prevent flow off of the fiber treating agent.

A cellulosic fiber blended nonwoven fabric according to the invention is obtained using thermoadhesive conjugate fibers according to the invention and cellulosic fibers, but other thermoadhesive conjugate fibers may also be included if necessary so long as the effect of the invention is not impeded.

A cellulosic fiber blended nonwoven fabric according to the invention may be obtained by the same working methods as described above for nonwoven fabrics, but an air-laid method is preferred for easier uniform dispersion of the thermoadhesive conjugate fibers and cellulosic fibers in order to achieve a satisfactory texture and feel of the cellulosic fiber blended nonwoven fabric.

The blending ratio of the thermoadhesive conjugate fibers (A) and cellulosic fibers (B) is not particularly restricted, and other fibers, fillers or super-absorbent resins may also be included so long as the effect of the invention is not impeded; however, if the proportion of the thermoadhesive conjugate fibers (A) is too low, the strength of the nonwoven fabric is reduced, whereas an increasing proportion of the thermoadhesive conjugate fibers (A) prevents clear expression of the properties of the cellulosic fibers (B), and therefore the preferred construction is 3-90 wt % of the thermoadhesive conjugate fibers (A) and 10-97 wt % of the cellulosic fibers (B).

An air-laid method as a working method suited for adequately exhibiting the effect of the invention will be characterized by using staple fibers, and will generally be carried out by the following procedure.

First, the staple fibers obtained by cutting the thermoadhesive conjugate fibers of the invention to about 5 mm are loaded into an opening machine for mechanical opening, and are then sent to a fiber feeding circulating duct. In order to obtain a cellulosic fiber blended nonwoven fabric, pulp (consisting of cellulosic fibers) is simultaneously crushed with a crusher, and the fibers are sent to the fiber feeding circulating duct. In the fiber feeding circulating duct, the staple fibers and pulp are blended and passed through a forming head to produce aggregated fibers. Forming heads of various shapes exist, but typically the blended aggregated fibers are lowered with a screen member on a drum, and suction is applied with a suction apparatus to produce build-up and form a web. The screen member referred to here is a mesh with round- or square-shaped holes.

Since the staple fibers in the web of the cellulosic fiber blended nonwoven fabric of the invention are uniformly dispersed, the texture and feel is superior to conventional pulp blended nonwoven fabrics, and the strength is higher due to the uniform presence of adhesion points.

A nonwoven fabric or cellulosic fiber blended nonwoven fabric according to the invention is easily obtained by heat treating the web made of the thermoadhesive conjugate fibers. As heat treatment methods there may be mentioned methods using a hot air drier, suction band drier or the like. Heat treatment melts the first component of the thermoadhesive conjugate fibers causing thermoadhesive at the adhesive point between the thermoadhesive conjugate fibers (A) or between the thermoadhesive conjugate fibers (A) and the cellulosic fibers (B). The heat treatment is most preferably conducted at a temperature above the melting point of the first component of the thermoadhesive conjugate fibers and below the melting point of the second component. The heat treatment time may be adjusted in consideration of the thermal fusion method used and the weight of the nonwoven fabric or cellulosic fiber blended nonwoven fabric to be obtained.

The obtained nonwoven fabric or cellulosic fiber blended nonwoven fabric may be further heat treated using a hot press or conveyer-type hot press for adjustment to the desired thickness, and if necessary, secondary working may be carried out either during or after the heat treatment to perform molding to a desired shape.

The nonwoven fabric or cellulosic fiber blended nonwoven fabric of the invention may be laminated with another web or sheet in order to obtain a laminated sheet. Examples of sheet materials include knitted fabrics, nonwoven fabrics, urethane foam, films, paper materials, wool molds, metal sheets, wood panels, and plastic panels, and preferably materials containing OH groups, which may maintain their respective functions. For example, a cellulosic fiber blended nonwoven fabric composed of thermoadhesive conjugate fibers alone or a blend of hydrophilic fibers and thermoadhesive conjugate fibers may be laminated therewith. Other materials may also be suitably laminated therewith so long as the effect of the invention is not impeded.

A cellulosic fiber blended nonwoven fabric according to the invention may be used for a variety of purposes, but the high strength of the nonwoven fabric and its satisfactory adhesion with cellulosic fibers renders it suitable for such purposes as wipers, absorbers and the like.

EXAMPLES

The present invention will now be explained by way of examples, with the understanding that the invention is in no way limited by these examples. The property values indicated in the examples were measured by the following methods.

Number of crimps: The number of crimps in the thermoadhesive conjugate fibers was measured according to JIS-L-1015.

Fiber fineness: The single fiber size of the thermoadhesive conjugate fibers was measured according to JIS-L-1015.

Unit weight: A 50 cm square was cut from the nonwoven fabric or cellulosic fiber blended nonwoven fabric and weighed, and the weight was expressed per unit area $(g/m^2)$.

Losing rate of cellulosic fiber: The weight (W1) of a 10 cm square cut from the cellulosic fiber blended nonwoven fabric was measured, and it was then mounted on the fly comb of a carding machine and vibrated for 3 minutes under conditions with an amplitude of 3 cm and a frequency of 1700 rpm, after which the weight (W2) was measured and the rate calculated by the following equation:

$$[(W1)-(W2)]/(W1) \times 100 = \text{losing rate (\%)}$$

Specific volume: The specific volume of the nonwoven fabric or cellulosic fiber blended nonwoven fabric was calculated by the following equation:

$$\text{Specific volume } (cm^3/g) = \text{Thickness (mm)/unit weight } (g/m^2) \times 1000$$

Amount of fiber treating agent adhering (%): The fiber treating agent coated onto 2 g of thermoadhesive conjugate fibers was extracted by immersion in 25 ml of methanol, and then the extraction methanol alone was evaporated off, the residue was weighed and the weight ratio with respect to the fibers was calculated.

MFR: The MFR values for the first component and second component were measured at 230° C. according to JIS-K-7210.

Fiber MFR: The MFR of the thermoadhesive conjugate fibers was measured at 230° C. according to JIS-K-7210. (For Examples 15 and 16, thermoadhesive fibers obtained with only the first component were used.)

MI: The MI values for the first component and second component were measured at 190° C. according to JIS-K-7210.

Nonwoven fabric strength: Three samples were taken from the nonwoven fabric or cellulosic fiber blended nonwoven fabric with a CD of 5 cm and an MD of 15 cm. The breaking strength (N/5 cm) of each of the samples was measured using an AGS500D Autograph by Shimazu Laboratories, Ltd. under conditions with a clamp spacing of 10 cm and a tensile speed of 10 cm/min, and the average of the three samples was recorded as the nonwoven fabric strength.

The machine flow direction (lengthwise direction) of the nonwoven fabric or cellulosic fiber blended nonwoven fabric was used as MD, and the direction orthogonal to the machine flow direction (widthwise direction) was used as CD.

Examples 1-22

Comparative Examples 1-7

A core/sheath type, side-by-side type or eccentric core/sheath type spinneret was used to spin conjugate fibers using a first component and second component under the conditions shown in Tables 1 and 2, and after drawing, 15 wt % aqueous solutions of the fiber treating agents shown in Tables 1 and 2 were coated onto the conjugate fiber surfaces with a touch roll, to obtain thermoadhesive conjugate fibers. The production conditions and conjugate fiber properties for the thermoadhesive conjugate fibers are shown in Table 1 (examples) and Table 2 (comparative examples).

The spinning temperatures shown in Tables 1 and 2 are the spinneret temperatures; the melt temperatures preceding the spinning pack were 220° C. for the first component, and 250° C. for PP or 310° C. for PET as the second component. The drawing temperature indicated is the roll temperature. The other abbreviations are as follows.

Modified PE1: Polymer comprising high-density polyethylene with a density of 0.960 g/cm³ as the backbone polymer and maleic anhydride at a grafting ratio of 0.3 mole/Kg; MI=3 g/10 min.

Modified PE2: Polymer comprising high-density polyethylene with a density of 0.960 g/cm³ as the backbone polymer and maleic anhydride at a grafting ratio of 0.15 mole/Kg; MI=10 g/10 min.

Modified PE3: Polymer comprising linear low-density polyethylene with a density of 0.931 g/cm³ as the backbone polymer and maleic anhydride at a grafting ratio of 0.15 mole/Kg; MI=14 g/10 min.

Modified PE4: Terpolymer comprising 78% ethylene, 19.5% ethylene acrylate and 2.5% maleic anhydride; MI=20 g/10 min.

Modified PE5: Copolymer of ethylene and glycidyl methacrylate; MFR=7 g/10 minute.

Modified PP1: Polymer comprising polypropylene as the backbone polymer and maleic anhydride at a grafting ratio of 0.15 mole/Kg; MFR=7 g/10 min.

PP: Crystalline homopolypropylene; MFR=17 g/10 min.

PET: Polyethylene terephthalate with a melting point of 250° C.

HDPE: High-density polyethylene with a density of 0.960 g/cm²; MI=17 g/10 min.

LLDPE: Linear low-density polyethylene with a density of 0.935 g/cm³; MI=30 g/10 min.

co-PP: Propylene copolymer comprising 4.0 wt % ethylene and 2.7 wt % butene-1; MFR=16 g/10 min.

Fiber treating agent A: Emulsion comprising 60% polyoxyethylene alkyl ether, 20% alkylphosphate sodium salt and 20% triethanolamine.

Fiber treating agent B: Emulsion comprising 60% polyoxyethylene alkyl ether, 30% alkylphosphate sodium salt and 10% ethylenediamine.

Fiber treating agent C: Emulsion comprising 60% polyoxyethylene alkyl ether, 20% fatty acid, 10% 1,5-pentanediol and 10% ethylenediamine.

Fiber treating agent D: Emulsion comprising 60% polyoxyethylene alkyl ether, 15% alkylphosphate sodium salt, 5% silicone, 10% glycerin and 10% ethylene glycol.

Fiber treating agent E: Emulsion comprising 60% polyoxyethylene alkyl ether, 20% alkylphosphate sodium salt and 20% 1,2-ethanedithiol.

TABLE 1

|  | First Component | Second Component | Structure | Sheath/core ratio | Spinning Temperature (C.) | Drawing Temperature (C.) |
|---|---|---|---|---|---|---|
| Example 1 | modifiedPE1(5%) HDPE(95%) | PP | core/sheath type | 65:35 | 280 | 90 |
| Example 2 | modifiedPE1(10%) HDPE(90%) | PP | core/sheath type | 65:35 | 280 | 90 |
| Example 3 | modifiedPE1(15%) HDPE(85%) | PP | core/sheath type | 65:35 | 280 | 90 |
| Example 4 | modifiedPE1(20%) HDPE(80%) | PP | eccentric core/sheath type | 65:35 | 280 | 90 |
| Example 5 | modifiedPE1(10%) HDPE(90%) | PP | core/sheath type | 50:50 | 280 | 90 |
| Example 6 | modifiedPE1(10%) HDPE(90%) | PP | side-by-side type | 40:60 | 280 | 90 |
| Example 7 | modifiedPE1(10%) LLDPE(90%) | PP | core/sheath type | 50:50 | 280 | 90 |
| Example 8 | modifiedPE1(10%) co-PP(90%) | PP | core/sheath type | 50:50 | 280 | 90 |
| Example 9 | modifiedPE2(10%) HDPE(90%) | PP | core/sheath type | 50:50 | 280 | 90 |
| Example 10 | modifiedPE2(50%) HDPE(50%) | PP | eccentric core/sheath type | 50:50 | 280 | 90 |
| Example 11 | modifiedPE2(50%) co-PP(50%) | PP | core/sheath type | 50:50 | 280 | 90 |
| Example 12 | modifiedPE3(10%) HDPE(90%) | PP | core/sheath type | 50:50 | 280 | 90 |
| Example 13 | modifiedPE4(10%) HDPE(90%) | PP | core/sheath type | 50:50 | 280 | 90 |
| Example 14 | modifiedPE5(10%) HDPE(90%) | PP | core/sheath type | 50:50 | 280 | 90 |
| Example 15 | modifiedPE1(10%) HDPE(90%) | PET | core/sheath type | 65:35 | 280 | 90 |
| Example 16 | modifiedPE2(10%) HDPE(90%) | PET | eccentric core/sheath type | 50:50 | 280 | 90 |
| Example 17 | modifiedPP1(10%) HDPE(90%) | PP | core/sheath type | 50:50 | 280 | 90 |
| Example 18 | modifiedPE1(10%) HDPE(90%) | PP | core/sheath type | 65:35 | 280 | 90 |
| Example 19 | modifiedPE1(10%) LLDPE(90%) | PP | core/sheath type | 50:50 | 280 | 90 |
| Example 20 | modifiedPE1(10%) LLDPE(90%) | PP | core/sheath type | 50:50 | 280 | 90 |
| Example 21 | modifiedPE4(10%) HDPE(90%) | PP | core/sheath type | 50:50 | 280 | 90 |

TABLE 1-continued

| | | | | | | |
|---|---|---|---|---|---|---|
| Example 22 | modifiedPE4(10%) HDPE(90%) | PP | core/sheath type | 50:50 | 280 | 90 |

| | Drawing ratio | Fineness (dtex/f) | Number of crimps (crimps/2.54 cm) | Fiber treating agent (X) | Amount of fiber treating agent(%) | Fiber MFR (g/10 min.) |
|---|---|---|---|---|---|---|
| Example 1 | 3.5 | 1.7 | 10 | A | 0.3 | 10.2 |
| Example 2 | 3.5 | 1.7 | 10 | B | 0.4 | 7.8 |
| Example 3 | 3.5 | 1.7 | 10 | C | 0.3 | 5.5 |
| Example 4 | 3.5 | 1.7 | 10 | D | 0.3 | 3.6 |
| Example 5 | 3.5 | 2.0 | 10 | A | 0.5 | 9.2 |
| Example 6 | 3.5 | 2.0 | 10 | A | 0.5 | 9.7 |
| Example 7 | 3.5 | 2.0 | 10 | A | 0.6 | 8.9 |
| Example 8 | 3.5 | 1.5 | 10 | B | 0.3 | 8.5 |
| Example 9 | 3.5 | 3.0 | 10 | B | 0.2 | 8.0 |
| Example 10 | 3.5 | 2.0 | 10 | B | 0.2 | 3.3 |
| Example 11 | 3.5 | 2.0 | 10 | C | 0.8 | 3.5 |
| Example 12 | 3.5 | 2.0 | 10 | D | 0.5 | 8.8 |
| Example 13 | 3.5 | 2.0 | 10 | D | 0.6 | 7.9 |
| Example 14 | 3.5 | 2.0 | 10 | C | 0.3 | 9.0 |
| Example 15 | 3.5 | 2.0 | 10 | A | 1.0 | 4.2 |
| Example 16 | 3.5 | 5.0 | 10 | A | 0.7 | 4.8 |
| Example 17 | 3.5 | 2.0 | 10 | A | 0.5 | 5.0 |
| Example 18 | 3.5 | 1.7 | 10 | E | 0.3 | 8.7 |
| Example 19 | 3.5 | 2.0 | 10 | A | 0.6 | 8.9 |
| Example 20 | 3.5 | 2.0 | 10 | A | 0.6 | 8.9 |
| Example 21 | 3.5 | 2.0 | 10 | D | 0.6 | 7.9 |
| Example 22 | 3.5 | 2.0 | 10 | D | 0.6 | 7.9 |

TABLE 2

| | First Component | Second Component | Structure | Sheath/ core ratio | Spinning Temperature (C.) | Drawing Temperature (C.) |
|---|---|---|---|---|---|---|
| Comparative Example 1 | modifiedPE1 (5%) HDPE(95%) | PP | core/sheath type | 65:35 | 280 | 90 |
| Comparative Example 2 | modifiedPE1(10%) HDPE(90%) | PP | core/sheath type | 65:35 | 280 | 90 |
| Comparative Example 3 | modifiedPE1(10%) LLDPE(90%) | PP | core/sheath type | 50:50 | 280 | 90 |
| Comparative Example 4 | modifiedPE2(50%) HDPE(50%) | PP | eccentric core/sheath type | 50:50 | 280 | 90 |
| Comparative Example 5 | modifiedPE3(10%) HDPE(90%) | PP | core/sheath type | 50:50 | 280 | 90 |
| Comparative Example 6 | modifiedPE4(10%) HDPE(90%) | PP | core/sheath type | 50:50 | 280 | 90 |
| Comparative Example 7 | modifiedPE1(10%) HDPE(90%) | PET | core/sheath type | 65:35 | 280 | 90 |

| | Drawing ratio | Fineness (dtex/f) | Number of crimps (crimps/2.54 cm) | Fiber treating agent (X) | Amount of fiber treating agent(%) | Fiber MFR (g/10 min.) |
|---|---|---|---|---|---|---|
| Comparative Example 1 | 3.5 | 1.7 | 10 | water | — | 26.6 |
| Comparative Example 2 | 3.5 | 1.7 | 10 | alkylphosphate sodium salt | 0.4 | 23.5 |
| Comparative Example 3 | 3.5 | 2.0 | 10 | water | — | 27.0 |
| Comparative Example 4 | 3.5 | 2.0 | 10 | water | — | 19.1 |
| Comparative Example 5 | 3.5 | 2.0 | 10 | water | — | 22.2 |
| Comparative Example 6 | 3.5 | 2.0 | 10 | alkylphosphate sodium salt | 0.6 | 30.3 |
| Comparative Example 7 | 3.5 | 2.0 | 10 | alkylphosphate sodium salt | 0.5 | 24.9 |

As clearly seen from Tables 1 and 2, the thermoadhesive conjugate fibers of the invention had lower fiber MFR values compared to the conventional thermoadhesive conjugate fibers which were not treated with a fiber treating agent as the essential condition of the invention. (cf. Example 1: 10.2 g/10 min and Comparative Example 1: 26.6 g/10 min.) This was due to crosslinking reaction between the modified polyolefin and multifunctional compound used according to the invention. The partial reduction in fiber cross-sectional area resulting from melting and flow off of the fiber surface caused by heating was thus inhibited, thus preventing very small (thin) sections of the fiber cross-section and avoiding strength reduction of the fibers themselves.

The thermoadhesive conjugate fibers obtained under the conditions shown in Tables 1 and 2 (corresponding to the examples and comparative examples) were cut to the prescribed fiber lengths for the nonwoven fabric production conditions shown in Table 3 (51 mm for carding method, 5 mm for air-laid method), webs were formed by each method, and then heat treatment was carried out with a through-air apparatus set to a working temperature of 143° C. to prepare nonwoven fabrics. The unit weights, specific volumes and strengths of the obtained nonwoven fabrics are shown in Table 3.

TABLE 3

|  | Production method of nonwoven fabric | unit weight (g/m$^2$) | specific volume (cm$^3$/g) | nonwoven fabric strength(N/5 cm) |
| --- | --- | --- | --- | --- |
| Example 1 | air-laid method | 25 | 18 | 50 |
| Example 2 | air-laid method | 25 | 18 | 56 |
| Example 3 | air-laid method | 25 | 19 | 58 |
| Example 4 | air-laid method | 25 | 30 | 61 |
| Example 5 | air-laid method | 25 | 23 | 57 |
| Example 6 | air-laid method | 25 | 25 | 51 |
| Example 7 | carding method | 25 | 35 | 88 |
| Example 8 | air-laid method | 25 | 23 | 55 |
| Example 9 | air-laid method | 25 | 22 | 58 |
| Example 10 | air-laid method | 25 | 29 | 57 |
| Example 11 | air-laid method | 25 | 23 | 56 |
| Example 12 | air-laid method | 25 | 24 | 53 |
| Example 13 | carding method | 25 | 30 | 76 |
| Example 14 | air-laid method | 25 | 23 | 49 |
| Example 15 | air-laid method | 25 | 89 | 48 |
| Example 16 | carding method | 25 | 72 | 70 |
| Example 17 | air-laid method | 25 | 20 | 45 |
| Example 18 | air-laid method | 25 | 18 | 46 |
| Comparative Example 1 | air-laid method | 25 | 18 | 30 |
| Comparative Example 2 | air-laid method | 25 | 18 | 33 |
| Comparative Example 3 | carding method | 25 | 35 | 55 |
| Comparative Example 4 | air-laid method | 25 | 29 | 26 |
| Comparative Example 5 | air-laid method | 25 | 24 | 25 |
| Comparative Example 6 | carding method | 25 | 30 | 51 |
| Comparative Example 7 | air-laid method | 25 | 89 | 20 |

As clearly seen in Table 3, the nonwoven fabrics of the invention were confirmed to have notably superior nonwoven fabric strength compared to the conventional nonwoven fabrics wherein the thermoadhesive conjugate fiber surfaces were not coated with a fiber treating agent as the essential condition of the invention. (cf. Example 1: 50 N/5 cm and Comparative Example 1: 30 N/5 cm.) This was due to crosslinking reaction of the thermoadhesive conjugate fibers of the invention at the fiber surfaces, as well as crosslinking reaction at the adhesive point between the fibers (melt adhesion).

The thermoadhesive conjugate fibers obtained under the conditions shown in Tables 1 and 2 (corresponding to the examples and comparative examples) were cut to the prescribed fiber lengths for the cellulosic fiber blended nonwoven fabric production conditions shown in Table 4 (51 mm for carding method, 5 mm for air-laid method), webs with the cellulosic fiber blend ratios shown in Table 4 were formed by each method, and then heat treatment was carried out with a through-air apparatus set to a working temperature of 143° C. to prepare cellulosic fiber blended nonwoven fabrics. The unit weights, specific volumes, strengths and cellulosic fiber (B) losing rates of the obtained cellulosic fiber blended nonwoven fabrics are shown in Table 4.

TABLE 4

|  | Production method of nonwoven fabric | cellulosic fiber ratio(A %:B %) | unit weight(g/m$^2$) | specific volume(cm$^3$/g) | nonwoven fabric strength(N/5 cm) | Losing ratio of B (%) |
| --- | --- | --- | --- | --- | --- | --- |
| Example 1 | air-laid method | 10:90 | 80 | 50 | 15 | 1.9 |
| Example 2 | air-laid method | 10:90 | 80 | 52 | 16 | 1.5 |
| Example 3 | air-laid method | 10:90 | 80 | 53 | 17 | 0.8 |
| Example 4 | air-laid method | 10:90 | 80 | 52 | 20 | 0.3 |
| Example 5 | air-laid method | 50:50 | 80 | 37 | 41 | 0.9 |
| Example 6 | air-laid method | 50:50 | 80 | 35 | 39 | 0.7 |
| Example 7 | air-laid method | 10:90 | 80 | 51 | 13 | 2.0 |
| Example 8 | air-laid method | 30:70 | 80 | 43 | 28 | 1.2 |
| Example 9 | air-laid method | 30:70 | 80 | 44 | 27 | 1.1 |
| Example 10 | air-laid method | 30:70 | 80 | 44 | 30 | 2.4 |
| Example 11 | air-laid method | 10:90 | 80 | 50 | 13 | 1.8 |
| Example 12 | air-laid method | 30:70 | 80 | 42 | 28 | 1.1 |
| Example 13 | air-laid method | 10:90 | 80 | 49 | 13 | 2.0 |
| Example 14 | air-laid method | 10:90 | 80 | 53 | 13 | 1.0 |
| Example 15 | air-laid method | 10:90 | 80 | 53 | 12 | 2.0 |
| Example 16 | air-laid method | 10:90 | 80 | 55 | 11 | 2.2 |
| Example 17 | air-laid method | 10:90 | 80 | 48 | 12 | 2.3 |
| Example 18 | air-laid method | 10:90 | 80 | 50 | 13 | 2.1 |
| Example 19 | carding method | 50:50 | 80 | 29 | 48 | 3.0 |
| Example 20 | air-laid method | 50:50 | 80 | 36 | 37 | 1.0 |
| Example 21 | carding method | 50:50 | 80 | 31 | 46 | 3.0 |
| Example 22 | air-laid method | 50:50 | 80 | 38 | 38 | 0.9 |
| Comparative Example 1 | air-laid method | 10:90 | 80 | 50 | 4 | 5.6 |
| Comparative Example 2 | air-laid method | 10:90 | 80 | 52 | 5 | 4.4 |
| Comparative Example 3 | air-laid method | 10:90 | 80 | 51 | 4 | 10.1 |

TABLE 4-continued

| | Production method of nonwoven fabric | cellulosic fiber ratio(A %:B %) | unit weight(g/m²) | specific volume(cm³/g) | nonwoven fabric strength(N/5 cm) | Losing ratio of B (%) |
|---|---|---|---|---|---|---|
| Comparative Example 4 | air-laid method | 30:70 | 80 | 44 | 7 | 6.2 |
| Comparative Example 5 | air-laid method | 30:70 | 80 | 42 | 7 | 4.9 |
| Comparative Example 6 | air-laid method | 10:90 | 80 | 49 | 2 | 9.7 |
| Comparative Example 7 | air-laid method | 10:90 | 80 | 53 | 2 | 7.2 |

Notes)
A: cut thermoadhesive conjugate fibers
B: cellulosic fibers

As clearly seen in Table 4, the cellulosic fiber blended nonwoven fabrics of the invention were confirmed to have notably superior nonwoven fabric strength (cf. Example 1: 15 N/5 cm and Comparative Example 1: 4 N/5 cm.) and cellulosic fiber (B) losing rates (cf. Example 1: 1.9% and Comparative Example 1: 5.6%), compared to the conventional cellulosic fiber blended nonwoven fabrics wherein the thermoadhesive conjugate fiber surfaces were not coated with a fiber treating agent as the essential condition of the invention. This was due to the reason explained above, and also to crosslinking reaction between the conjugate fibers and the cellulosic fibers (B) at the surfaces of the thermoadhesive conjugate fibers of the invention.

In addition, the cellulosic fiber blended nonwoven fabrics obtained by the air-laid method had the thermoadhesive conjugate fibers (A) and cellulosic fibers (B) more uniformly dispersed and mixed compared to the cellulosic fiber blended nonwoven fabrics obtained by the carding method, and therefore the cellulosic fiber (B) losing rates were more satisfactory (cf. Example 20:1.0% and Example 19: 3.0%) and the bulk property was superior (cf. Example 20: 36 cm³/g and Example 19: 29 cm³/g). The thermoadhesive conjugate fibers of the invention may therefore be considered suitable for obtaining cellulosic fiber blended nonwoven fabrics by air-laid methods.

Example 23

The cellulosic fiber blended nonwoven fabric of Example 1 in Table 4 was cut to a size of 15 cm×15 cm and laminated with a polyethylene film of the same size and subjected to embossing heat treatment at 125° C. to prepare a floor cleaning wiper.

Comparative Example 8

The cellulosic fiber blended nonwoven fabric of Comparative Example 1 in Table 4 was cut to a size of 15 cm×15 cm and laminated with a polyethylene film of the same size and subjected to embossing heat treatment at 125° C. to prepare a floor cleaning wiper.

When the floor cleaning wipers of Example 23 and Comparative Example 8 were compared, the nonwoven fabric strength of Example 23 was found to be higher than that of Comparative Example 8, and when used as a wiper it was more resistant to tearing and exhibited notably improved manageability during wiping. Also, because of its satisfactory adhesion with the sheet used for lamination, the manageability was also improved from the standpoint of interlayer peeling during use of the wiper.

Example 24

The cellulosic fiber blended nonwoven fabric of Example 1 in Table 4 was cut to a size of 10 cm×25 cm and the entire cut cellulosic fiber blended nonwoven fabric was folded with a tissue for use as a paper diaper absorber.

Comparative Example 9

The cellulosic fiber blended nonwoven fabric of Comparative Example 1 in Table 4 was cut to a size of 10 cm×25 cm and the entire cut cellulosic fiber blended nonwoven fabric was folded with a tissue for use as a paper diaper absorber.

When the paper diaper absorbers of Example 24 and Comparative Example 9 were compared, the nonwoven fabric strength of Example 24 was found to be higher than that of Comparative Example 9, and it thus exhibited more satisfactory shape retention when used as an absorber, as well as a greater effect of preventing collapse of the absorber after absorption of water or the like. In addition, the satisfactory adhesion with the pulp allowed sufficient water absorption to be exhibited by the absorber.

The thermoadhesive conjugate fibers of the present invention are thermoadhesive conjugate fibers which comprise a thermoplastic resin (I) containing a modified polyolefin with at least one type of reactive functional group as a first component and a thermoplastic resin (II) with a higher melting point than the first component as a second component, having a novel construction wherein the first component is formed continuously along the length of at least a portion of the fiber surface, and the fiber surfaces are coated with a fiber treating agent containing a multifunctional compound capable of reacting with the reactive functional group in the modified polyolefin. Heat treatment therefore results in crosslinking reaction at the fiber surfaces, creating firm adhesion points when a nonwoven fabric is produced, and yielding high-strength nonwoven fabrics. In addition, because of their satisfactory adhesion with other materials and particularly cellulosic fibers, the resulting cellulosic fiber blended nonwoven fabrics have almost no peeling or losing of the cellulosic fibers and exhibit high strength, such that when used as absorbers for sanitary materials, wipers and the like, very excellent absorption properties, wiping properties and manageability are exhibited.

The invention claimed is:

1. A method for producing thermoadhesive conjugate fibers, the method comprising:
providing a first thermoplastic resin component comprising a modified polyolefin with at least one type of reactive functional group and a second thermoplastic resin component comprising polyester with a higher melting point than the melting point of the first thermoplastic resin component, wherein the component ratio of the first component and the second component in fiber cross-section is in the range of 10/90 to 90/10;

spinning the first thermoplastic resin component and the second thermoplastic resin component at a temperature of from 180 to 350 ° to obtain spun conjugate fibers comprising the first and the second thermoplastic resin components, the first component being formed continuously along the length of at least of a portion of the conjugate fiber surface;

drawing the spun conjugate fibers at a temperature lower than the melting point of the first thermoplastic resin component to obtain drawn conjugate fibers; and coating the surfaces of the drawn conjugate fibers with a fiber treating agent comprising a multifunctional compound reacting with the reactive functional group of the modified polyolefin, the coating ranging from 0.1 to 2.0 wt%, based on the weight of the fibers, to form the thermoadhesive conjugate fibers, whereupon the multifunctional compound reacts with the reactive functional group of the modified polyolefin at a temperature above the melting point of the first thermoplastic resin component and below the melting point of the second thermoplastic resin component, to form a crosslinked structure at adhesive points between the thermoadhesive conjugate fibers, provided that when the multifunctional compound is a polyamine, the polyamine is ethylenediamine or diethylenetriamine.

2. The method of claim 1 wherein drawing is at a temperature ranging from 40° C. to 120° C.

3. The method of claim 1 wherein the component ratio of the first component and the second component in fiber cross-section is in the range of 30/70 to 70/30.

4. The method of claim 1 and further comprising cutting the span-fibers to form cut span-fibers.

5. The method of claim 1 and further comprising crimping the span-fibers.

6. The method of claim 5 wherein the span-fibers have 0 to 20 crimps/2.54 cm.

7. The method of claim 5 wherein the span-fibers have 5 to 30 crimps/2.54 cm.

8. The method of claim 1, wherein the multifunctional compound is selected from the group consisting of ethylene diamine, diethylenetriamine and triethanolamine.

9. A method for producing a nonwoven fabric made of thermoadhesive conjugate fibers, the method comprising:

providing a first thermoplastic resin component comprising a modified polyolefin with at least one type of reactive functional group and a second thermoplastic resin component comprising polyester with a higher melting point than the melting point of the first thermoplastic resin component, wherein the component ratio of the first component and the second component in fiber cross-section is in the range of 10/90 to 90/10;

spinning the first thermoplastic resin component and the second thermoplastic resin component at a temperature of from 180 to 350 °, to obtain spun conjugate fibers comprising the first and the second thermoplastic resin components, the first component being formed continuously along the length of at least of a portion of the conjugate fiber surface;

drawing the spun conjugate fibers at a temperature lower than the melting point of the first thermoplastic resin component to obtain drawn conjugate fibers;

coating the surfaces of the drawn conjugate fibers with a fiber treating agent comprising a multifunctional compound reacting with the reactive functional group of the modified polyolefin, the coating ranging from 0.1 to 2.0 wt% based on the weight of the fibers, to obtain the thermoadhesive conjugate fibers;

cutting the thermoadhesive conjugate fibers to form webs of the thermoadhesive conjugate fibers;

subjecting the webs to heat treatment at a working temperature above the melting point of the first thermoplastic resin component and below the melting point of the second thermoplastic resin component to allow for crosslinking reaction between the multifunctional compound and the reactive group of the modified polyolefin to result in a crosslinked structure at adhesive points between the thermoadhesive conjugate fibers; and obtaining the nonwoven fabric made of the thermoadhesive conjugate fibers, provided that when the multifunctional compound is a polyamine, the polyamine is ethylenediamine or diethylenetriamine.

10. The method of claim 9 wherein the modified polyolefin is a copolymer of an olefin monomer and an unsaturated carboxylic acid or its derivative.

11. The method of claim 9 wherein the modified polyolefin is a copolymer of polyethylene and an unsaturated carboxylic acid or its derivative.

12. The method of claim 9 wherein the multifunctional compound is a polyhydric alcohol.

13. The method of claim 9 wherein the multifunctional compound is a polyamine.

14. The method of claim 9, wherein the multifunctional compound is selected from the group consisting of ethylenediamine, diethylenetriamine and triethanolamine.

15. A method of producing a nonwoven fabric comprising:

forming a web comprising thermoadhesive conjugate fibers coated with 0.1 to 2 wt% of a fiber treating agent on a surface of the fibers, the fiber treating agent comprising a multifunctional group, the thermoadhesive conjugate fibers comprising first and second thermoplastic resin components, the first component being a modified polyolefin resin with at least one type of reactive functional group, formed continuously along a length of at least of a portion of the conjugate fiber and the second component having a melting point that is greater than a melting point of the first component wherein the component ratio of the first component and the second component in fiber cross-section is in the range of 10/90 to 90/10; and subjecting the web to heating at a temperature above a melting point of the first component and below a melting point of the second component to crosslink the thermoadhesive conjugate fibers and form the nonwoven fabric, wherein the modified polyolefin reacts with the multifunctional compound of the coating during heating and crosslinks the thermoadhesive conjugate fibers at adhesive points between the thermoadhesive conjugate fibers, provided that when the multifunctional compound is a polyamine, the polyamine is ethylenediamine or diethylenetriamine.

16. The method of claim 15, wherein the multifunctional compound is selected from the group consisting of ethylenediamine, diethylenetriamine and triethanolamine.

* * * * *